(12) United States Patent
Berglund et al.

(10) Patent No.: US 9,527,163 B2
(45) Date of Patent: Dec. 27, 2016

(54) SUPPORT APPARATUS

(71) Applicant: PROVIDE COMMERCE, INC., San Diego, CA (US)

(72) Inventors: Mark Berglund, Woodridge, IL (US); Jeff Kowalski, Chicago Heights, IL (US)

(73) Assignee: PROVIDE COMMERCE, INC., San Diego, CA (US)

(*) Notice: Subject to any disclaimer, the term of this patent is extended or adjusted under 35 U.S.C. 154(b) by 43 days.

(21) Appl. No.: 14/527,538

(22) Filed: Oct. 29, 2014

(65) Prior Publication Data
US 2016/0121437 A1    May 5, 2016

(51) Int. Cl.
| B23K 26/362 | (2014.01) |
|---|---|
| B23K 26/36 | (2014.01) |
| B23Q 7/05 | (2006.01) |
| B23K 37/053 | (2006.01) |

(52) U.S. Cl.
CPC .......... *B23K 26/362* (2013.01); *B23K 26/365* (2013.01); *B23K 37/0538* (2013.01); *B23Q 7/055* (2013.01)

(58) Field of Classification Search
CPC ..... A47B 73/00; A47G 23/02; B01F 11/0025; B23K 37/0426; B23K 37/0538; B23Q 1/40; B23Q 3/00; B23Q 3/02; B23Q 3/105; B23Q 7/05; B23Q 7/055; F16M 11/2028

See application file for complete search history.

(56) References Cited

U.S. PATENT DOCUMENTS

| 1,445,488 | A | * | 2/1923 | Clark | ............... | B01F 9/0016 |
|---|---|---|---|---|---|---|
| | | | | | | 366/233 |
| 2,006,451 | A | * | 7/1935 | Glidden | ............... | B01F 9/0014 |
| | | | | | | 248/130 |
| 2,052,900 | A | * | 9/1936 | Searles | ............... | B65G 39/04 |
| | | | | | | 193/37 |

(Continued)

FOREIGN PATENT DOCUMENTS

| EP | 2801402 A1 * | 11/2014 | ......... F16M 11/2028 |
|---|---|---|---|
| JP | 03-023239 A | 1/1991 | |
| WO | WO 2012-124583 A1 | 9/2012 | |

OTHER PUBLICATIONS

International Search Report and Written Opinion for International Application Serial No. PCT/US2015/057900, dated Feb. 29, 2016.

*Primary Examiner* — Joseph J Hail
*Assistant Examiner* — Tyrone V Hall, Jr.
(74) *Attorney, Agent, or Firm* — Sanjeev K. Dhand; Dhand Law PC

(57) ABSTRACT

An example apparatus includes a first axle extending from a left side support to a right side support, the first axle configured to axially rotate; a second axle extending from the left side support to the right side support and being substantially parallel to the first axle, the second axle configured to axially rotate, the second axle and the first axle being spaced apart. Each of the first axle and second axle include two or more lower support wheel assemblies and two or more higher support wheel assemblies alternatingly positioned along each axle. The higher support wheel assemblies have a larger diameter than the lower support wheel assemblies, and each of the lower support wheel assemblies and the higher support wheel assemblies are configured to axially rotate with a corresponding axle.

6 Claims, 3 Drawing Sheets

(56) References Cited

U.S. PATENT DOCUMENTS

| | | | | |
|---|---|---|---|---|
| 2,600,747 | A | * | 6/1952 | Faust ..................... B65G 13/08 118/221 |
| 3,664,531 | A | * | 5/1972 | Magnusson et al. .. B23Q 7/055 414/432 |
| 3,840,102 | A | * | 10/1974 | Dawson ................. B65G 13/11 193/35 R |
| 3,921,575 | A | | 11/1975 | Ishii |
| 4,227,794 | A | * | 10/1980 | Tabin ................. G03D 13/046 366/208 |
| D263,307 | S | * | 3/1982 | Collins ........................ D15/147 |
| 4,624,729 | A | | 11/1986 | Bresciani |
| 4,628,811 | A | | 12/1986 | Lozen |
| 7,070,319 | B2 | * | 7/2006 | Peterman, Jr. ........ B01F 9/0016 366/213 |
| 8,429,989 | B2 | * | 4/2013 | Raupp .................... B07C 5/126 73/865.8 |
| 2007/0133348 | A1 | * | 6/2007 | Naljotov ............... B01F 9/0021 366/213 |
| 2008/0251478 | A1 | * | 10/2008 | Jaskowski ................ C12H 1/22 211/74 |
| 2014/0036615 | A1 | * | 2/2014 | Okuda ................ B01F 11/0025 366/114 |

* cited by examiner

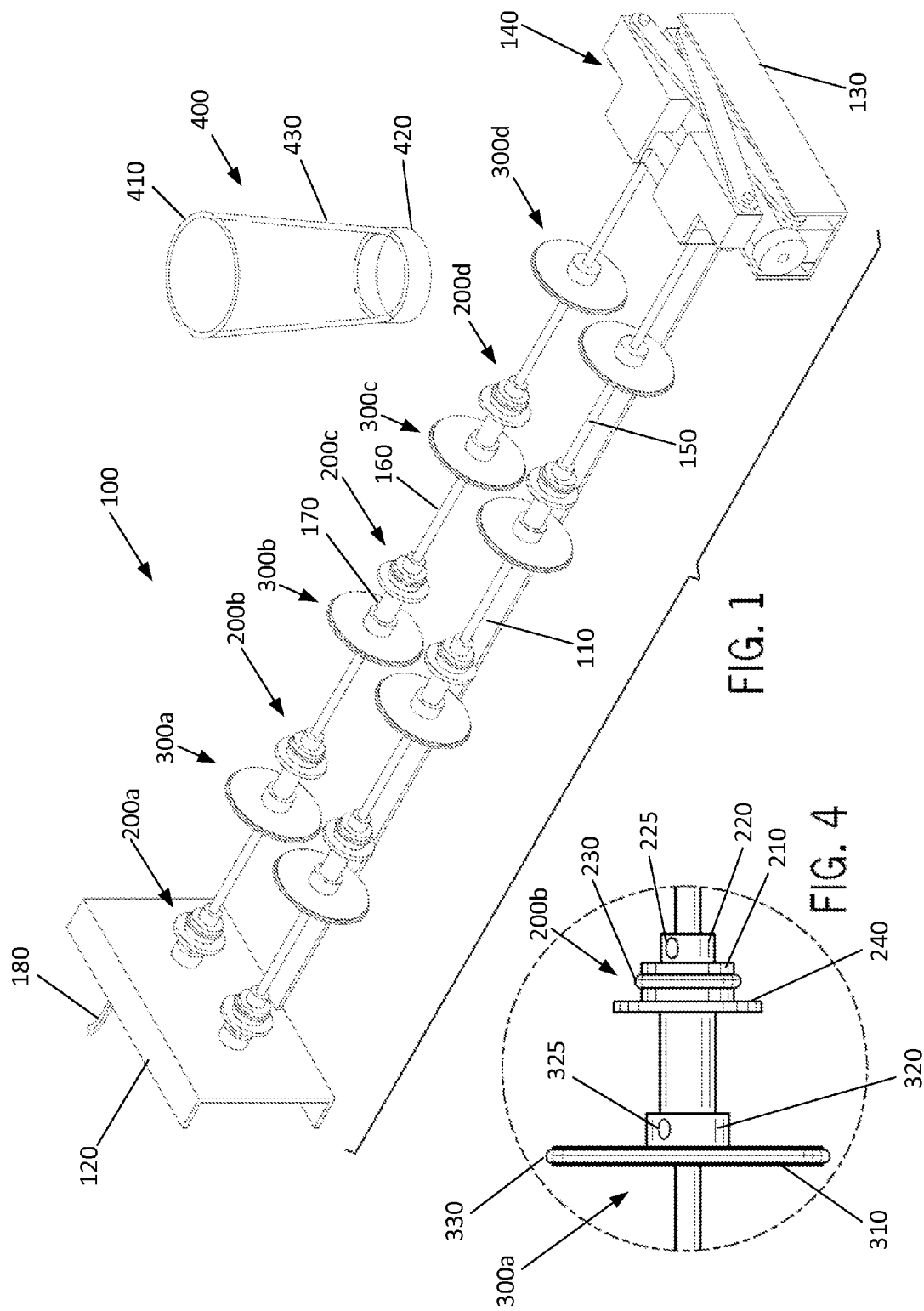

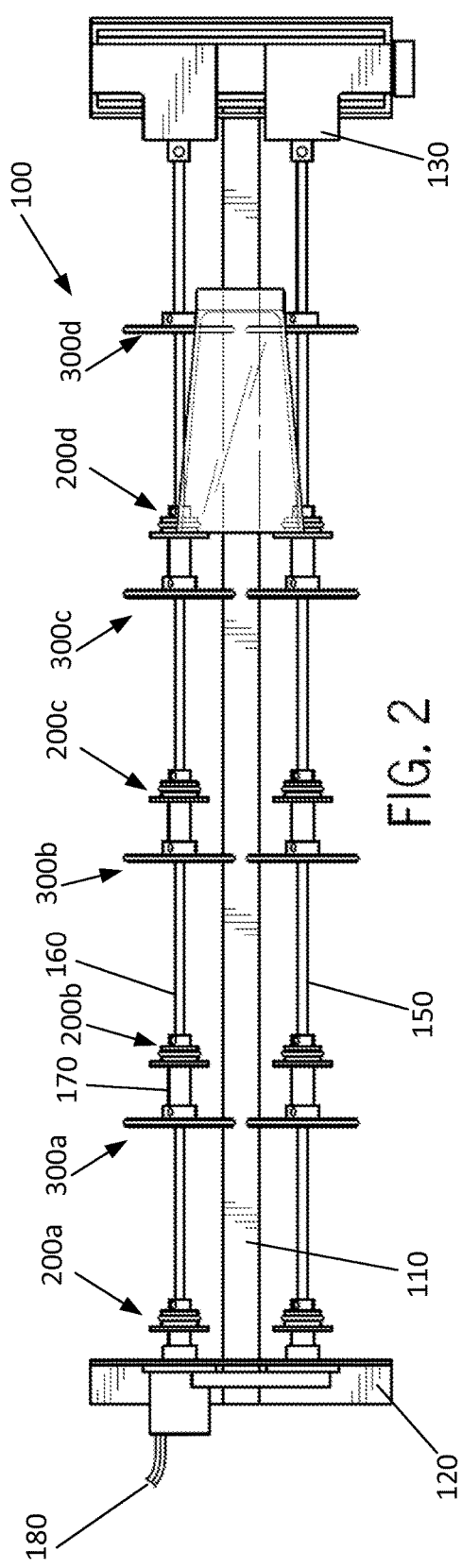
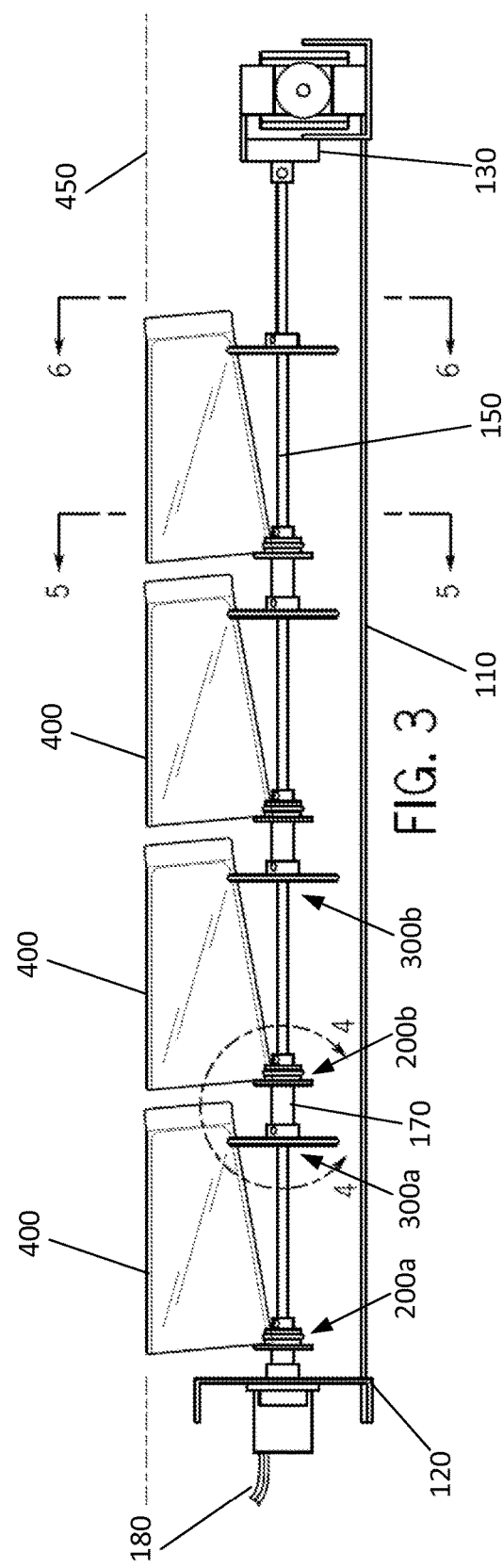

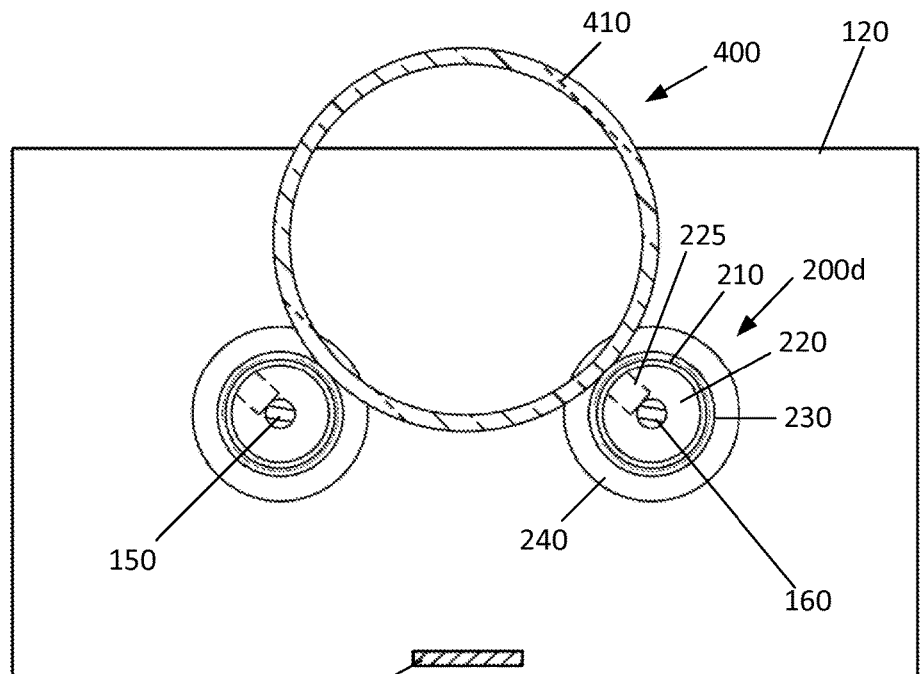
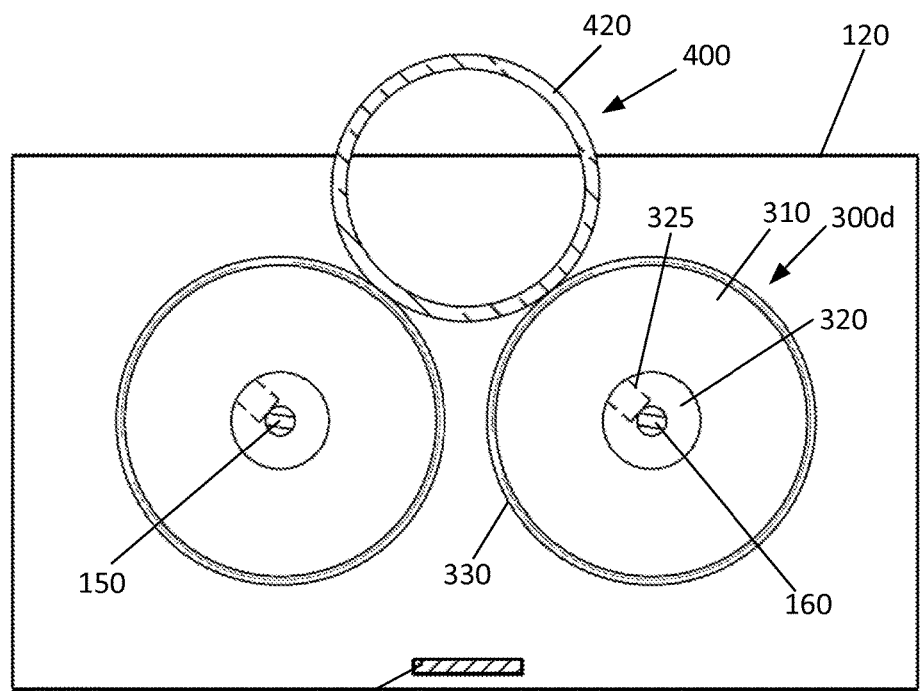

SUPPORT APPARATUS

BACKGROUND

Laser etching is used to imprint text, images or other graphics on various materials. For example, laser etching can be used to personalize a variety of objects, such as glasses, for example. In conventional systems, one object at a time is etched with a laser source. Further, laser etching on devices with non-flat surfaces can present difficulties in the etching process.

BRIEF DESCRIPTION OF THE DRAWINGS

For a more complete understanding of various examples, reference is now made to the following descriptions taken in connection with the accompanying drawings in which:

FIG. 1 illustrates a perspective view of an example apparatus and an example product for use with the example apparatus;

FIG. 2 illustrates a top view of the example apparatus of FIG. 1;

FIG. 3 illustrates a side view of the example apparatus of FIG. 1 loaded with four example objects;

FIG. 4 illustrates a detailed view of a section of the example apparatus of FIGS. 1-3;

FIG. 5 illustrates a cross-sectional view taken along 5-5 of FIG. 3; and

FIG. 6 illustrates a cross-sectional view taken along 6-6 of FIG. 3.

DETAILED DESCRIPTION

Various examples described below provide an apparatus for supporting a plurality of products in a manner that allows the plurality of products to be laser etched. The products are supported such that a surface to be laser etched of each of the products is rotatably positioned on a plane or a line that may represent a focal position of the laser source. Thus, while conventional systems may provide a single rotary tool to etch a single item, using the various examples described herein, multiple products can be simultaneously mounted on the apparatus for etching by a single laser source, with each of the multiple products positioned on the laser focal plane or line. In addition, while the examples herein are described for use in laser etching, other uses for the examples are contemplated within the scope of the present disclosure. For example, the apparatus may be used for printing on a cylindrical or conical surface where the print head is positioned close to the surface. In various examples, the printing may be laser printing or ultraviolet (UV) printing.

An example apparatus 100 is described below with reference to FIGS. 1-6. The example apparatus 100 is formed with a base 110 that extends the length of the apparatus 100. In the illustrated example apparatus 100, the base 110 is a single piece. Those skilled in the art will appreciate that the base 110 may be formed in a variety of manners which are contemplated within the scope of the present disclosure. The length of the base 110 may be selected to particular applications. For example, the base 110 may be provided with a length to accommodate the limits of a laser device. In other examples, the base 110 may have a length to accommodate a desired number of objects. As illustrated in FIG. 3, the example apparatus 100 is provided with a base 110 with a length to accommodate four example objects, such as glasses 400.

The example apparatus 100 is provided with side supports 120, 130 at each end of the base 110. The side supports 120, 130 extend vertically upward from the base. The size of the side supports 120, 130 may be selected according to desired parameters, such as strength and particular application of the example apparatus 100.

In the illustrated example, one side support 130 is provided with a gear assembly 140 to provide for the rotation of two parallel axles 150, 160. The gear assembly 140 may also include a drive motor (not shown) and other components, such as a power supply. Such gear assemblies are well known to those skilled in the art, and a detailed discussion of such gear assemblies is unnecessary in this disclosure. The gear assembly 140 of the example apparatus 100 causes axial rotation of the two parallel axles 150, 160 in the same direction. Thus, the axles 150, 160 may both be selectively rotated in either direction. A control cable 180 may be used to provide instruction signals to the gear assembly 140. For example, a controller, such as a computer CPU (not shown) may be connected to the apparatus 100 and may provide electronic signals to the gear assembly 140 to control operation of the apparatus, including rotation direction and speed of the axles 150, 160.

The axles 150, 160 extend from the gear assembly 140 in one side support 130 to the other side support 120, where the axles 150, 160 may be allowed to freely rotate. As illustrated in FIGS. 1-6, the axles 150, 160 are spaced apart from each other. In various examples, the spacing between the axles 150, 160 may be made variable and may be sufficient to provide room for support wheels 200, 300 mounted thereon, as described in greater detail below. The axles 150, 160 may be formed of a variety of materials, such as steel or aluminum, for example, and are provided with sufficient strength and rigidity to stably support the objects to be etched, such as the four glasses 400 illustrated in FIG. 3.

Each axle 150, 160 is provided with a plurality of support wheel assemblies 200a-d, 300a-d. As illustrated in the example of FIGS. 1-6, the example apparatus 100 is provided with alternating lower support wheel assemblies 200a-d and higher support wheel assemblies 300a-d mounted on each axle 150, 160. A set of four wheel assemblies, two on each axle, provide support for one object. For examples, lower support wheel assemblies 200a and higher support wheel assemblies 300a on each axle 150, 160 may provide support for a single glass. Thus, the example apparatus 100 illustrated in FIGS. 1-6 provides four sets of wheel assemblies 200a-d, 300a-d to provide support for four glasses.

Within each set of support wheel assemblies, the separation between the lower support wheel assembly 200a and the higher support wheel assembly 300a may be made variable, as described in greater detail below. A spacer 170 may be provided between the sets of support wheel assemblies (e.g., between higher support wheel assembly 300b and lower support wheel assembly 200c) to maintain sufficient separation between the sets of support wheel assemblies.

The example apparatus 100 may be used for laser etching of a plurality of objects mounted on the apparatus 100. Simultaneously mounting a plurality of objects on the apparatus for laser etching can significantly increase throughput by reducing the time required to set up the apparatus and the laser. Often, the object may have a shape that presents obstacles to etching of multiple objects on a single mounting. For example, the object to be etched may be a glass, such as the glass 400 illustrated in FIG. 1. The glass may have a generally truncated conical shape with a wide end 410 and a narrow end 420 with a tapered side wall 430.

In the laser etching process, the surface to be etched is placed at a focal length from the laser source. In order to etch the outer surface of a non-flat object, such as the glass 400, the object may be moved during the etching process to maintain the point being etched at the focal point. The example apparatus 100 allows a plurality of objects to be maintained at a focal length from a laser source (not shown). For example, as illustrated in FIG. 3, the side wall of each of the four glasses 400 is maintained along a focal length from a laser source positioned above the apparatus. The focal point of the laser, which may be translated in a direction parallel to the axles 150, 160, is indicated in FIG. 3 by the dotted line 450, referred to herein as the focal line 450.

Thus, with reference to FIG. 3, the laser source may scan from left to right to etch each glass 400 mounted on the apparatus 100. As the laser scans from left to right, the desired text, graphic or other such etching may be etched on each of the plurality of objects. In order to provide precise an accurate etching, the surface to be etched should be at approximately the focal point.

In this regard, the example apparatus 100 allows positioning of multiple objects, such as glasses 400, in the desired position and allows for rotating of the objects to allow different points of the non-flat surface to be etched. Thus, in the illustrated examples, the glasses may be positioned to rest on the support wheel assemblies 200, 300. The support wheel assemblies 200, 300 may be sized and positioned such that an edge of the side wall of the glasses 400 is aligned with the focal line 450. The support wheel assemblies 200, 300 are provided with different diameters to account for the varying radius of the truncated conical shape of the glass 400. Further, the distance between the support wheel assemblies 200, 300 may be varied to accommodate different sizes and shapes of the glasses 400, as well as different types of objects with a variety of shapes. Thus, while the examples illustrated in FIGS. 1-6 show the object to be etched as a glass having a truncated conical shape, a variety of other objects having a variety of shapes are contemplated within the scope of the present disclosure. By way of a non-limiting example, the objects may include vases for flowers having a variety of shapes.

With reference to FIGS. 4-6, an example of a set of support wheel assemblies is described in greater detail. As noted above, the set of support wheel assemblies includes a lower support wheel assembly 200 and a higher support wheel assembly 300. The lower support wheel assembly 200 includes a lower support wheel 210, and the higher support wheel assembly 300 includes a higher support wheel 310. As illustrated in the examples of FIGS. 4-6, the lower support wheel 210 has a smaller diameter than the higher support wheel 310, with each support wheel 210, 310 fixedly rotating with an axle 150, 160. The lower support wheel 210 is positioned around a lower support wheel hub 220. The lower support wheel hub 220 secures the lower support wheel assembly 200 to the axle with a set screw 225. The set screw 225 may be tightened to securely position the lower support wheel assembly 200 to the axle and may be loosened to allow re-positioning of the lower support wheel assembly 200 to another position, for example. In various examples, the lower support wheel 210 and the lower support wheel hub 220 may be integrally formed.

Similarly, the higher support wheel 310 may be positioned around a higher support wheel hub 320. The higher support wheel hub 320 secures the higher support wheel assembly 300 to the axle with a set screw 325. The set screw 325 may be tightened or loosened to securely position or to allow re-positioning of, respectively, the higher support wheel assembly 300. In various examples, the higher support wheel 310 and the higher support wheel hub 320 may be integrally formed.

Each of the lower support wheel 210 and the higher support wheel 310 may be provided with a rubber O-ring 230, 330 around the outer edge of the support wheels 210, 310. The O-ring 230, 330 may provide a desired amount of friction between the support wheels 210, 310 and the object to be etched. Thus, when the axle is rotated, causing the support wheels 210, 310 to rotate, the object resting on the wheels may rotate in the opposite direction. In the case of the glass 400, the rotation allows etching to be performed on all portions of the side wall 430 of the glass 400.

The lower support wheel assembly 200 is also provided with a stopper 240. The stopper 240 provides for a guide for the positioning of the glass 400 on the support wheel assemblies 200, 300. Further, the stopper 240 prevents unintentional lateral movement of the object. As illustrated most clearly in FIG. 3, the wide end 410 of the glass rests on the lower wheel 210 and against the stopper 240. The glass 400 is forced against the stopper 240 by gravity, and the stopper 240 prevents further lateral movement of the glass 240.

In operation, a user may mount multiple objects, such as glasses, on the apparatus. As illustrated in FIG. 3, for example, each object may be mounted on a set of support wheels 210, 310. A wider portion of the object, such as the wide end 410 of the glass 400 may be positioned on the lower support wheels 210, and the narrower portion of the object, such as the narrow end 420 of the glass, may be positioned on the higher support wheels 310. In the illustrated examples, the narrow portion and the wider portion are at or near the ends of the glass 400. In other examples, one or both of the narrow portion and the wider portion may be away from an end of the object. Further, while the examples illustrate a set of support wheels including two wheels on each axle, in other examples, additional wheels may be used.

After mounting of the objects, a controller may control operation of the apparatus 100, as well as a laser source. In this regard, the controller may coordinate the portion of the object being etched by controlling the rotation of the object through rotation of the axles 150, 160 with operation of the laser source. Thus, the controller may etch a desired text, image or other graphic on the object 400. In various examples, each object mounted on the apparatus may be etched with the identical graphic, or a different object may be etched on one or more of the objects mounted on the apparatus. In further examples, the objects mounted on the apparatus 100 may be identical to each other (e.g., the four identical glasses 400 illustrated in FIG. 3) or may be of different sizes and/or shapes from each other. In this regard, while the rotation of each object is related to the rotation of the other objects mounted on the apparatus, the etching of each object may be wholly independent from etching of the other objects.

Thus, in accordance with various examples of the present disclosure, a greater throughput of laser etched objects may be produced. Further, as noted above, in addition to laser etching, the various examples may be used for various other applications which are contemplated within the scope of the present disclosure including, but not limited to, laser printing or UV printing. The various examples set forth herein are described in terms of example block diagrams, flow charts and other illustrations. Those skilled in the art will appreciate that the illustrated examples and their various alternatives can be implemented without confinement to the illustrated examples. For example, block diagrams and their accompanying description should not be construed as mandating a particular architecture or configuration.

What is claimed is:

1. An apparatus, comprising:
a first axle extending from a left side support to a right side support, the first axle configured to axially rotate;
a second axle extending from the left side support to the right side support and being substantially parallel to the first axle, the second axle configured to axially rotate, the second axle and the first axle being spaced apart;
wherein each of the first axle and second axle comprising:
two or more lower support wheel assemblies and two or more higher support wheel assemblies alternatingly positioned along each axle,
wherein the higher support wheel assemblies have a larger diameter than the lower support wheel assemblies, and
wherein each of the lower support wheel assemblies and the higher support wheel assemblies are configured to axially rotate with a corresponding axle.

2. The apparatus of claim 1, wherein a spacing between a lower support wheel assembly and an adjacent higher support wheel assembly on each axle is adjustable.

3. The apparatus of claim 1, further comprising:
a gear assembly to facilitate axial rotation of each axle in the same direction.

4. The apparatus of claim 1, wherein each higher wheel assembly includes:
a wheel hub;
a set screw to secure the higher wheel assembly to a corresponding axle;
a support wheel; and
an O-ring around a perimeter of the support wheel.

5. The apparatus of claim 1, wherein each lower wheel assembly includes:
a wheel hub;
a set screw to secure the lower wheel assembly to a corresponding axle;
a support wheel;
an O-ring around a perimeter of the support wheel; and
a stopper.

6. The apparatus of claim 4, wherein each lower wheel assembly includes:
a wheel hub;
a set screw to secure the lower wheel assembly to a corresponding axle;
a support wheel;
an O-ring around a perimeter of the support wheel; and
a stopper.

* * * * *